(12) United States Patent
Mabuchi et al.

(10) Patent No.: US 7,280,895 B2
(45) Date of Patent: Oct. 9, 2007

(54) VEHICULAR KINETIC CONTROL SYSTEM

(75) Inventors: Mamoru Mabuchi, Kariya (JP); Motoaki Kataoka, Kariya (JP); Hiromichi Tanaka, Tokai (JP); Mamoru Sawada, Yokkaichi (JP)

(73) Assignee: DENSO Corporation, Kariya (JP)

( * ) Notice: Subject to any disclaimer, the term of this patent is extended or adjusted under 35 U.S.C. 154(b) by 331 days.

(21) Appl. No.: 11/137,909

(22) Filed: May 26, 2005

(65) Prior Publication Data

US 2005/0267648 A1 Dec. 1, 2005

(30) Foreign Application Priority Data

May 31, 2004 (JP) ............... 2004-161808

(51) Int. Cl.
*G05D 1/00* (2006.01)
(52) U.S. Cl. ............... 701/1; 701/29; 701/36; 701/79; 340/438
(58) Field of Classification Search ............ 701/1, 701/22, 24, 29, 36, 79; 340/438, 439, 441
See application file for complete search history.

(56) References Cited

U.S. PATENT DOCUMENTS

| | | | |
|---|---|---|---|
| 5,901,806 A | 5/1999 | Takahashi | |
| 6,381,524 B1 | 4/2002 | Kuragaki et al. | |
| 6,505,107 B2 | 1/2003 | Kuragaki et al. | |
| 6,738,705 B2 | 5/2004 | Kojima et al. | |
| 2004/0019411 A1 | 1/2004 | Kuragaki et al. | |
| 2005/0004743 A1 | 1/2005 | Kojima et al. | |
| 2006/0036357 A1* | 2/2006 | Isono et al. | ............... 701/22 |

FOREIGN PATENT DOCUMENTS

| | | |
|---|---|---|
| EP | 1 298 624 A1 | 4/2003 |
| EP | 1 318 042 A2 | 6/2003 |
| JP | A-4-015799 | 1/1992 |

OTHER PUBLICATIONS

French Search Report for corresponding French Application No. FR 0505396 dated Apr. 25, 2006.

* cited by examiner

*Primary Examiner*—Gertrude A. Jeanglaude
(74) *Attorney, Agent, or Firm*—Harness, Dickey & Pierce, PLC

(57) ABSTRACT

In a state where a driver sees a region near a vehicle, a finally-requested output-shaft torque is set so that a response is hastened in a deceleration and slowed in an acceleration. Thereby, a vehicle takes a forward descending position in which the front end of the vehicle is descending, which gives a driver a sense of deceleration or a sense of turning. Further, this position causes a front wheel load acting on the ground to increase and a rear wheel load acting on the ground to decrease, in comparison to a normal position. This thereby makes it easier for the vehicle to decelerate when practically decelerating or turning, and further enables turning to slightly over-steer. A resultant vehicular kinetic characteristic becomes comparable with a sense that is expected by the driver.

8 Claims, 5 Drawing Sheets

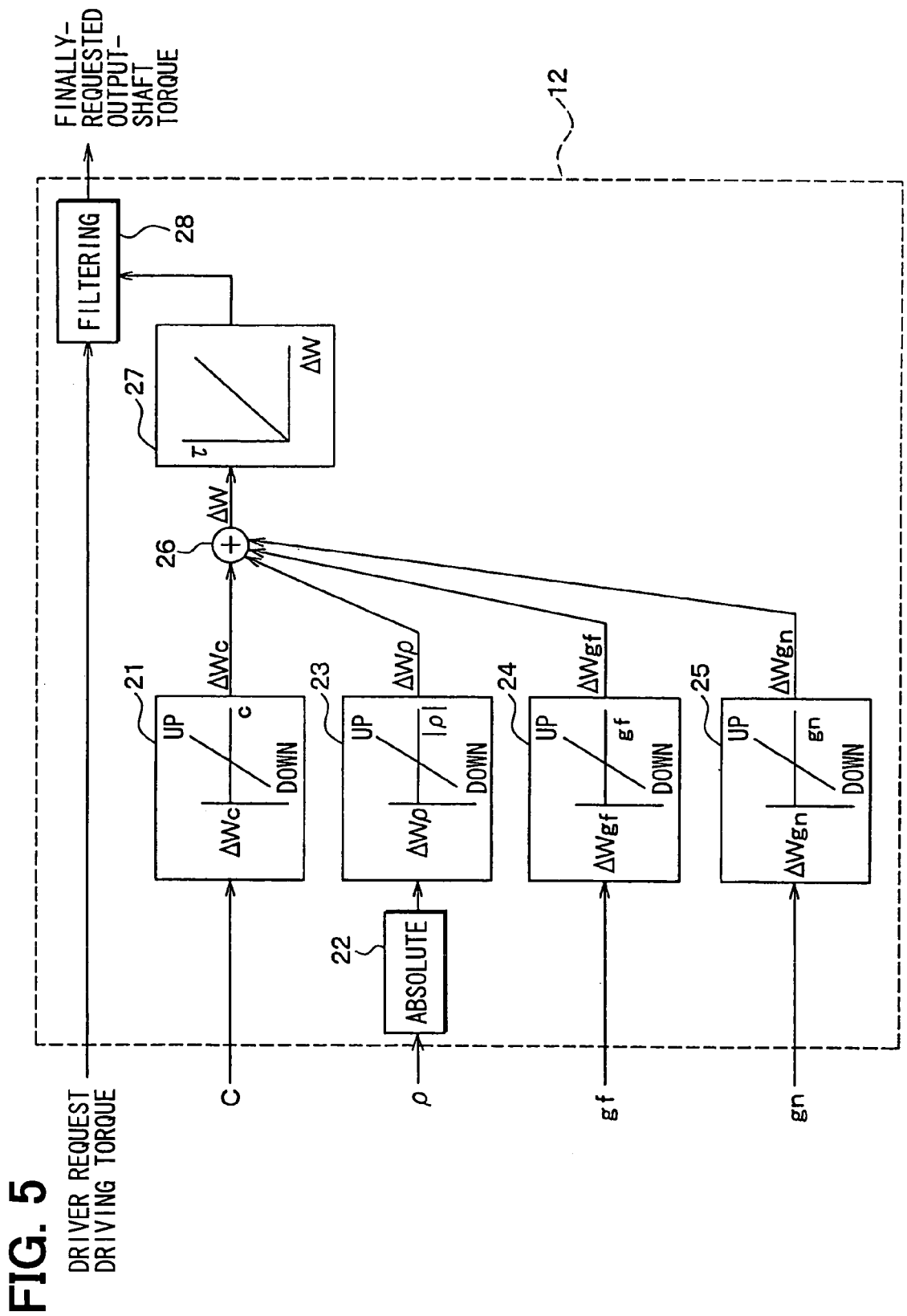

VEHICULAR KINETIC CONTROL SYSTEM

CROSS REFERENCE TO RELATED APPLICATIONS

This application is based on and incorporates herein by reference Japanese Patent Application No. 2004-161808 filed on May 31, 2004.

FIELD OF THE INVENTION

The present invention relates to a vehicular kinetic control system capable of modifying kinetic characteristics based on environments surrounding a subject vehicle.

BACKGROUND OF THE INVENTION

Vehicular kinetic characteristics such as running, turning, or stopping are changed depending on operating points of devices (e.g., engine, steering, suspension, brake, or other vehicular mechanisms), further, depending on slopes of roads. Therefore, a driver conducts predictive operations after understanding the vehicular kinetic characteristics, or conducts modifying operations after understanding vehicular actions. Namely, the driver needs to respond to variations of the vehicular characteristics.

Specific Examples are as Follows.

1) Characteristics variations due to devices

Switching transmission shift positions changes a driving characteristic to an accelerator operation. For instance, an acceleration/operating gain varies because of a gear ratio, or a response varies because of operating points of a torque converter or an engine.

Further, a response is changed by variations in engine operating points, e.g., engine revolution numbers or loads. For instance, in a gasoline-port injection engine, a response is changed by a response of an air system, switching due to a control, or a control of a valve for an inlet/outlet air.

Furthermore, in general, a vehicle is designed to slightly under-steer as a turning curvature increases (or a lateral acceleration increases). For instance, a vehicle is designed by considering a weight distribution, a suspension geometric structure, a suspension kinematics, or a tire characteristic. The vehicle that is thus designed tends to go short of additional steering when the vehicle enters a sharper curve during turning.

2) Characteristics variations due to road shapes

A road slope changes a vertical load balance in the front and rear wheels, which thereby further changes a steering characteristic. For instance, in an ascending slope, the load in the front wheel decreases, so the vehicle tends to under-steer. In contrast, in a descending slope, the load in the front wheel increases, so the vehicle tends to over-steer. Further, a vehicular kinetic characteristic is changed depending on a road-surface frictional coefficient μ. Therefore, the driver needs to understand a road surface condition.

Driver's recognition or sense of acceleration or turning during vehicle's traveling is differentiated even when the same acceleration or the same turning is conducted in individual cases as follows: when a curve or a slope is present ahead of a vehicle, when a preceding vehicle is present ahead of a vehicle, or when a road becomes narrower ahead of a vehicle. Further, conditions such as brightness or weather surrounding the relevant vehicle affect the driver's recognition. The recognition or the sense of the driver is changed depending on a distance of a driver's gaze.

In detail, as a vehicle position slants, a sense of acceleration or a sense of turning may become strong. For instance, when the front end of a vehicle goes up (nose up) because of driving, the sense of accelerating may increase. When the front end of a vehicle goes down (nose diving) because of braking, a sense of decelerating may increase. Further, when a vehicle rolls during turning, a sense of turning may increase.

Thus, a driver needs to properly conduct an operation since relationships between various parameters are changed by influences of the vehicular characteristics or road environments. The various parameters include actual accelerating, decelerating, or turning action; vehicular positions at the relevant actions; and driver's operations for individual parts of the vehicle that cause the foregoing

SUMMARY OF THE INVENTION

It is an object of the present invention to provide a vehicular kinetic control system that is capable of achieving a vehicular action meeting driver's intentions to thereby decrease a frequency of driver's operation for modifying and relieves a load of the driver's operation for modifying.

To achieve the above object, a vehicular kinetic control system in a vehicle is provided with the following. An interpreting unit is included for obtaining, based on an accelerator operating amount in the vehicle, a first physical amount corresponding to a first driving force that a driver of the vehicle requests. An environment detecting unit is included for detecting environment information relating to the vehicle. A modifying unit is included for modifying the first physical amount based on the environment information to thereby set a second physical amount that corresponds to a second driving force that is finally requested. A driving force controlling unit that generates a control signal based on the second physical amount. Further, an actuator is included for generating the second driving force based on the control signal. Here, the modifying unit sets the second physical amount by modifying a response characteristic of the first physical amount based on the environment information.

BRIEF DESCRIPTION OF THE DRAWINGS

The above and other objects, features, and advantages of the present invention will become more apparent from the following detailed description made with reference to the accompanying drawings. In the drawings:

FIG. 5 is a block diagram of a modifying unit that sets a finally-requested output-shaft torque;

DETAILED DESCRIPTION OF THE PREFERRED EMBODIMENTS

First Embodiment

Figure 1:
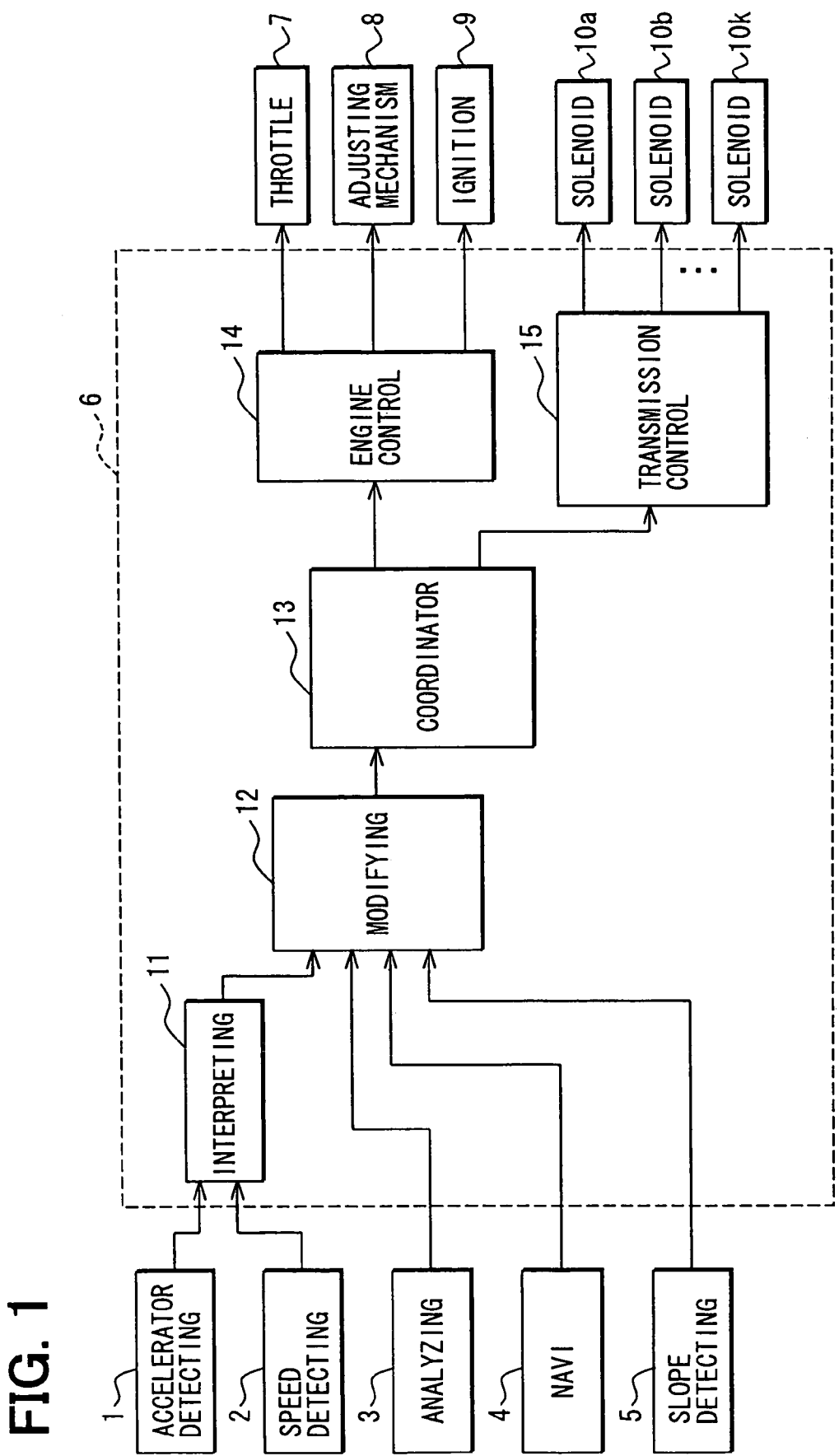
FIG. 1 is a block diagram of a structure of a vehicular kinetic control system according to a first embodiment of the present invention.

A vehicular kinetic control system according to a first embodiment of the present invention will be explained with reference to drawings. As shown in FIG. 1, a vehicular kinetic control system is mounted in a subject vehicle and includes an accelerator detecting unit 1, a speed detecting unit 2, an environment analyzing unit 3, a navigation device 4, a slope detecting unit 5, an engine ECU 6, and various actuators 7 to 9, 10a to 10k.

The accelerator detecting unit 1 consists of a stroke sensor that detects a stroke amount of known devices such as an accelerator pedal, and a stepping-force sensor that detects a stepping force on an accelerator pedal. The accelerator detecting unit 1 outputs signals corresponding to an accelerator opening degree to an engine ECU 6.

The environment analyzing unit 3 works as an environment detecting unit to obtain image data of a sight forward of the vehicle with an in-vehicle camera and analyzes the image data to thereby obtain environment information of environments surrounding the subject vehicle. The environment analyzing unit 3 further detects an obstacle such as a preceding vehicle present ahead of the vehicle with a laser radar or the like to thereby obtain the environment information from detection results.

For instance, the environment analyzing unit 3 works as a surrounding vehicle detecting unit or a data inputting unit to determine whether a surrounding vehicle (in particular, a preceding vehicle) is present by analyzing the image data. When the preceding vehicle is determined to be present, the environment analyzing unit 3 further obtains how far the preceding vehicle is located from the subject vehicle, how many other vehicles are present, or relative speeds or relative positions between the relevant preceding vehicles and the subject vehicle. Furthermore, the environment analyzing unit 3 obtains states of obstacles present ahead of the subject vehicle, weather, sights of surrounding regions, danger degrees that the subject vehicle is expected to encounter. Environment information of the regions surrounding the subject vehicle that is obtained by the data inputting unit is given to the engine ECU 6.

The navigation device 4 along with the environment analyzing unit 3 constitutes the environment detecting unit to store road map information and output it to the engine ECU 6. In detail, the navigation device 4 stores as road map information nodes and segments assigned to roads and road slopes or the cants with the nodes or the segments associated to the road slopes or the cants. The navigation device 4 further stores information relating to branching/converging of roads, intersections, crossings, or road widths. The navigation device 4 determines a road where the subject vehicle is presently traveling using a present position detecting function that is generally provided in a navigation device to thereby determine a curvature $\rho$ of a position where the subject vehicle will be traveling in a near future (e.g., after a few seconds). This determined curvature $\rho$ of the position is given to the engine ECU 6 along with other road map information such as a road slope of the relevant position. Further, it can be designed that the navigation device 4 obtains information indicating easiness in turning with respect to the subject vehicle from information of the curvature at a present position and a curvature to be encountered in a near future and gives the obtained result to the engine ECU 6.

The slope detecting unit 5 along with the environment analyzing unit 3 and the navigation device 4 constitutes the environment detecting unit to obtain a slope of a road where the subject vehicle is traveling at present (hereinafter referred to as a road slope at present) using a known technology.

The engine ECU 6 constitutes a vehicular kinetic control device. The engine ECU 6 receives various signals and information from the accelerator detecting unit 1, the speed detecting unit 2, the image data inputting unit 3, the navigation device 4, and the slope detecting unit 5 to thereby output control signals to various actuators 7 to 9, 10a to 10k for controlling an engine or a transmission. In detail, the engine ECU 6 includes a request interpreting unit 11, a modifying unit 12, a power train coordinator 13, an engine control unit 14, and a transmission control unit 15.

The request interpreting unit 11 interprets a request value for vehicle movement based on signals from the accelerator detecting unit 1 and the speed detecting unit 2. Namely, the request interpreting unit 11 interprets the driver's request from an accelerator opening degree corresponding to an accelerator operating amount conducted by the driver and obtains a request value necessary for meeting the driver's request with respect to a speed at the moment. Here, a driver request driving torque is obtained as the request value; then, data representing the driver request driving torque is conveyed to the modifying unit 12. Further, the request value corresponding to an accelerator opening degree is obtained so that a driving force or an acceleration (component) of a traveling direction can become constant. In a slope, since the gravitational acceleration is added, the acceleration of a traveling direction does not accord with an acceleration acting on the ground. However, the acceleration of a traveling direction can be varied depending on whether an opening degree is large or small when a relevant vehicle has a large engine power.

The modifying unit 12 modifies the received driver request driving torque based on the environment information inputted from the environment analyzing unit 3, the road map information or the curvature $\rho$ obtained from the navigation device 4, and the road slope at present from the slope detecting unit 5 to thereby obtain a finally-requested output-shaft torque.

Figure 2:
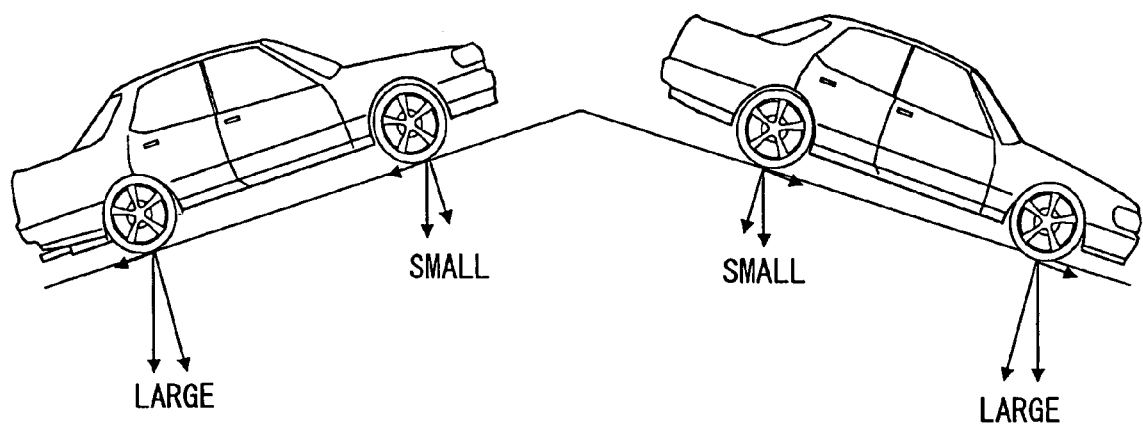
FIG. 2 is a view showing loads acting upon the ground.

Here, the reason why the road slope at present is considered is as follows. As shown in FIG. 2, a load acting on the ground varies depending on a road slope. In an ascending slope shown in the left side of FIG. 2, the front wheel load acting on the ground is small while the rear wheel load acting on the ground is large. In contrast, in a descending slope in the right side of FIG. 2, the front wheel load acting on the ground is large while the rear wheel load acting on the ground is small. Therefore, the received driver request driving torque that is modified based on the environment information or the road map information and the curvature $\rho$ is further modified based on the road slope at present to thereby obtain a finally-requested output-shaft torque.

For instance, the finally-requested output-shaft torque is obtained based on the following knowledge.

1) Response characteristic is varied based on forward road environment

Under a road environment where a driver tends to see a region near the subject vehicle, the finally-requested output-shaft torque is set so that a response in a deceleration is hastened while a response in an acceleration is slowed.

This road environment where a driver tends to see a region near the subject vehicle is as follows.

a) Case where a vehicle speed is low. Here, the driver tends to see a region near the subject vehicle, so that a gaze distance of the driver becomes short.

b) Case where a curving curvature of a forward curve is large (a turning radius is small). Here, a distance to a tangential line of an inside curve becomes short, so that a gaze distance becomes short.

c) Case where a slope varies. Because of variations in a slope, a distance a driver can see becomes short. For instance, in an ascending slope, a seeable distance tends to become short.

d) Case where a surrounding vehicle approaches. Since a driver sees this approaching vehicle (or target that should be gazed), a gaze distance becomes short.

e) Case of approaching an intersection, or case where a road width becomes narrow. A driver tends to see a periphery of the intersection or the both sides of the road, so that a gaze distance becomes short.

f) Case of a dark place, or encountering a fog. A seeable distance of a driver becomes short.

Thus, whether a driver is situated in a case of tending to see a region near the subject vehicle is analyzed by the modifying unit 12 based on the environment information and the road map information. When the driver is situated in the above cases a) to f), the finally-requested output-shaft torque is set so that a response in a deceleration is hastened while a response in an acceleration is slowed.

Figure 3:
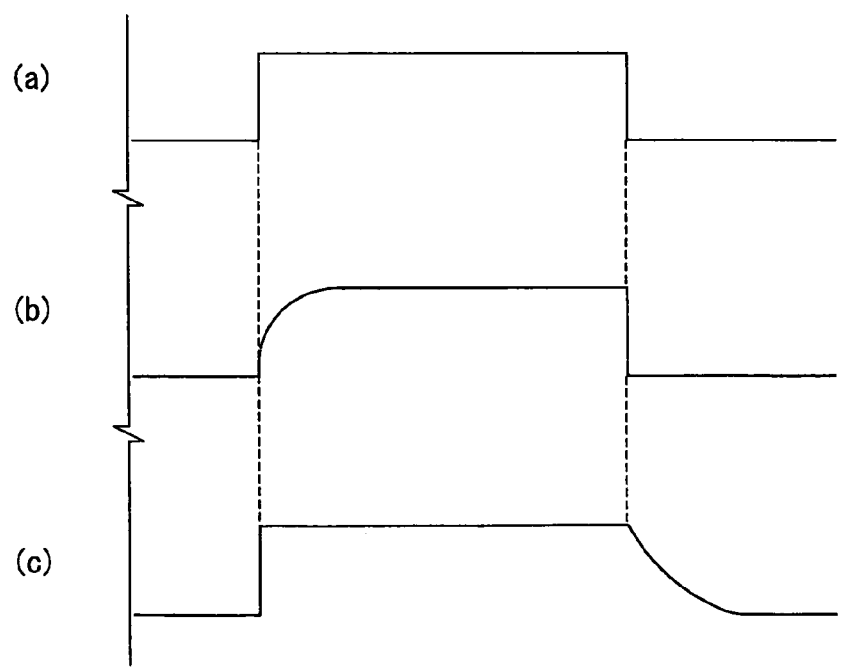
FIG. 3 is waveforms showing a relationship of a finally-requested output-shaft torque to a driver request torque.

For instance, suppose a case that a driver request driving torque is represented by a characteristic shown in FIG. 3($a$). A finally-requested output-shaft torque obtained after modification by the modifying unit 12 is set to be represented by a characteristic shown in FIG. 3($b$).

Namely, suppose that the torque sharply increases and decreases as shown in FIG. 3($a$). Here, when the torque is increasing, a vehicle body takes a forward ascending position in which the front end of the vehicle is rising because of a reactive force to the torque. When the torque is decreasing, a vehicle body takes a forward descending position in which the front end of the vehicle is diving because of a reactive force to the torque.

Figure 4A:
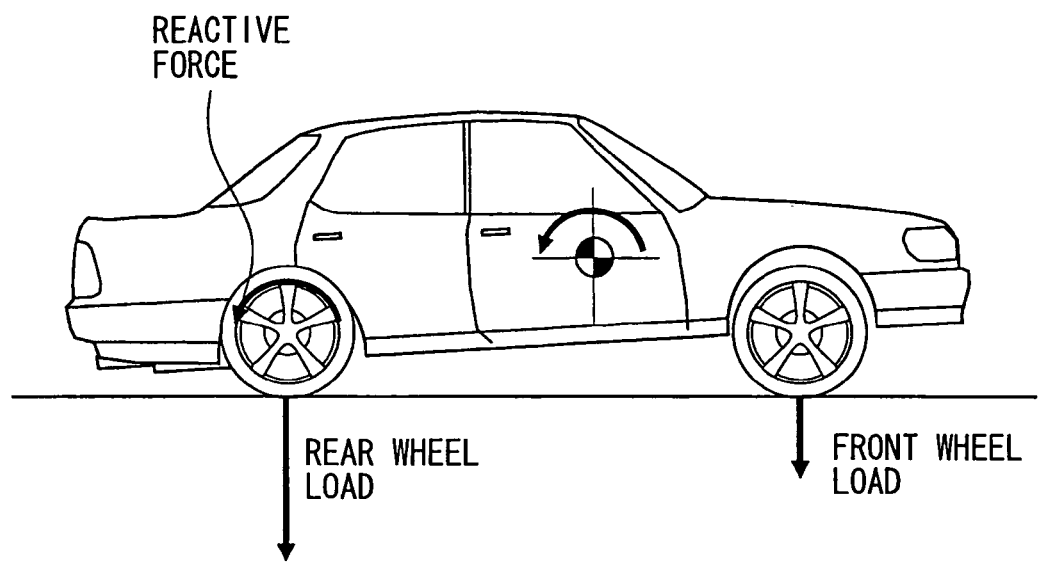
FIG. 4A is a view of a vehicle that is forward ascending.
Figure 4B:
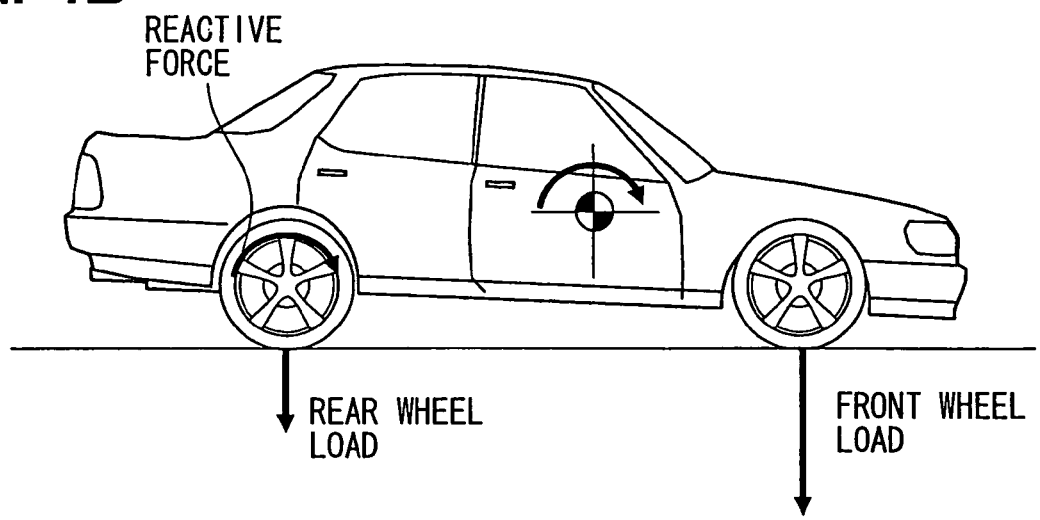
FIG. 4B is a view of a vehicle that is forward descending.

However, when the finally-requested torque is set as shown in FIG. 3 ($b$), the following takes place. Here, the torque gradually increases and sharply decreases. Since there is little influence from the reactive force to the torque during the increasing of the torque, a vehicle body does not take a forward ascending position. During the decreasing of the torque, a vehicle body takes a forward descending position because of influence of a reactive force to the torque; namely, the position of the vehicle becomes as shown in FIG. 4B.

In contrast, under a road environment where a driver tends to see a region far from the subject vehicle, the finally-requested output-shaft torque is set so that a response in a deceleration is slowed while a response in an acceleration is hastened.

This road environment where a driver tends to see a region far from the subject vehicle is present in cases not corresponding to the above-described cases a) to f), namely, in a case where a vehicle speed is high, where a straight road continues, where a descending slope is present, where no surrounding vehicles are present, where a road width is broad, where a sight is bright, or where a long seeable region is secured.

Thus, whether a driver is situated in a case of tending to see a region far from the subject vehicle is analyzed by the modifying unit 12 based on the environment information and the road map information. When the driver is situated in the relevant cases, the finally-requested output-shaft torque is set so that a response in a deceleration is slowed while a response in an acceleration is hastened.

For instance, suppose a case that a driver request driving torque is represented by a characteristic shown in FIG. 3($a$). A finally-requested output-shaft torque obtained after modification by the modifying unit 12 is set to be represented by a characteristic shown in FIG. 3($c$).

Namely, a finally-requested torque is set as shown in FIG. 3($c$) when the driver request driving torque sharply increases and decreases as shown in FIG. 3($a$). Here, the torque very sharply increases and gradually decreases. Since there is influence from the reactive force to the torque during the increasing of the torque, a vehicle body takes a forward ascending position. Since there is little influence of a reactive force to the torque during the decreasing of the torque, a vehicle body does not take a forward descending position.

Next, the modifying unit 12 will be explained with reference to a block diagram of FIG. 5.

As shown in FIG. 5, the modifying unit 12 receives as follows: danger degrees computed from a relative speed or relative distance with a preceding vehicle from the environment analyzing unit 3; a curvature $\rho$ of a curve approached in a few seconds and a near-future road slope from the navigation device 4, and a road slope at present from the slope detecting unit 5.

Of the modifying unit 12, a first setting unit 21 obtains a kinetic characteristic index $\Delta Wc$ representing a kinetic characteristic that should be varied depending on the danger degrees received. An absolute value unit 22 converts the received curvature $\rho$ to an absolute value. A second setting unit 23 obtains a kinetic characteristic index $\Delta W\rho$ representing a kinetic characteristic that should be varied depending on the absolute value of the curvature $\rho$.

Similarly, a third and fourth setting units 24, 25 obtain kinetic characteristic indexes $\Delta Wgf$, $\Delta Wgn$ representing kinetic characteristics that should be varied depending on the received road slope in near-future and the received road slope at present, respectively.

Next, an addition unit 26 conducts an addition or selecting the maximum with respect to each of the kinetic characteristics $\Delta Wc$, $\Delta W\rho$, $\Delta Wgf$, $\Delta Wgn$ to obtain a kinetic characteristic $\Delta W$ that represents a kinetic characteristic that is supposed to be varied after entirely considering the curvature $\rho$, the surrounding environment such as the relative distance or relative speed with the preceding vehicle, the road slope gf in near future, and the road slope gn at present. Based on this kinetic characteristic index $\Delta W$, a time constant setting unit 27 determines a time constant $\tau$ in a filtering unit 28. The filtering unit 28 conducts a filtering process aiming at a transmission characteristic corresponding to the time constant $\tau$. Thereby, the driver request driving torque is modified and a finally-requested output-shaft torque is obtained.

Thus, the finally-requested output-shaft torque is set by the modifying unit 12 and then sent to a power train coordinator 13.

The power train coordinator 13 determines control of the engine or the transmission so as to achieve the finally-requested output-shaft torque. In detail, the power train coordinator 13 determines a requested engine torque that is requested as a torque generated by the engine and a transmission shift that is used for an automatic transmission. The requested engine torque and the transmission shift determined are sent to the engine control unit 14 and the transmission control unit 15, respectively.

To achieve the requested engine torque, the engine control unit 14 outputs control signals to various actuators 7 to 9. In detail, they are an engine throttle 7 that adjusts a throttle opening degree, an adjustment mechanism 8 that adjusts a fuel injection amount, an ignition device 9 that adjusts a timing for engine ignition. Based on the outputted signals, the engine throttle 7, the adjustment mechanism 8, and the ignition device 9 are controlled, and consequently, the requested engine torque that is sent from the power train coordinator 13 is generated by the engine.

To achieve the requested engine torque, the transmission control unit 15 outputs control signals to various actuators 10a to 10k. In detail, they are individual solenoids 10a to 10k that switch oil pressure circuits provided in the transmission. Based on the outputted signals, the individual solenoids are driven with duties to thereby cause the transmission shift sent from the power train coordinator 13 to be set.

Here, the power train coordinator 13, the transmission control unit 15, and the transmission control unit work as a driving force controlling unit that determines a control signal for driving the actuators 7 to 9, 10a to 10k.

As explained above, under a case that a driver tends to see a region near the subject vehicle, a finally-requested output-shaft torque is set so that a response in a deceleration is hastened while a response in an acceleration is slowed. Therefore, a vehicle body takes a forward descending position to thereby possibly give a sense of deceleration or turning to a driver. Taking the forward descending position increases a front wheel load acting on the ground and decreases a rear wheel load acting on the ground, in comparison to a normal position. This makes it easier for the vehicle to decelerate when practically decelerating or turning. Further, this can cause the vehicle to slightly over-steer in the turning. As a result, a kinetic characteristic of the relevant vehicle becomes comparable with a sense that is expected by the driver.

For instance, when the vehicle changes a traveling lane on an expressway, the driver gazes straight forward instead of seeing a turning direction. Therefore, a lateral movement is preferred instead of a rotational movement. In this case, a vehicle body is caused to take a forward ascending position, so the vehicle tends to under-steer. Thereby, the resultant lateral movement gives the driver a sense of safety without a sense of significantly turning. Namely, the kinetic characteristic of the vehicle becomes comparable with a sense that is expected by the driver.

Figure 6A:
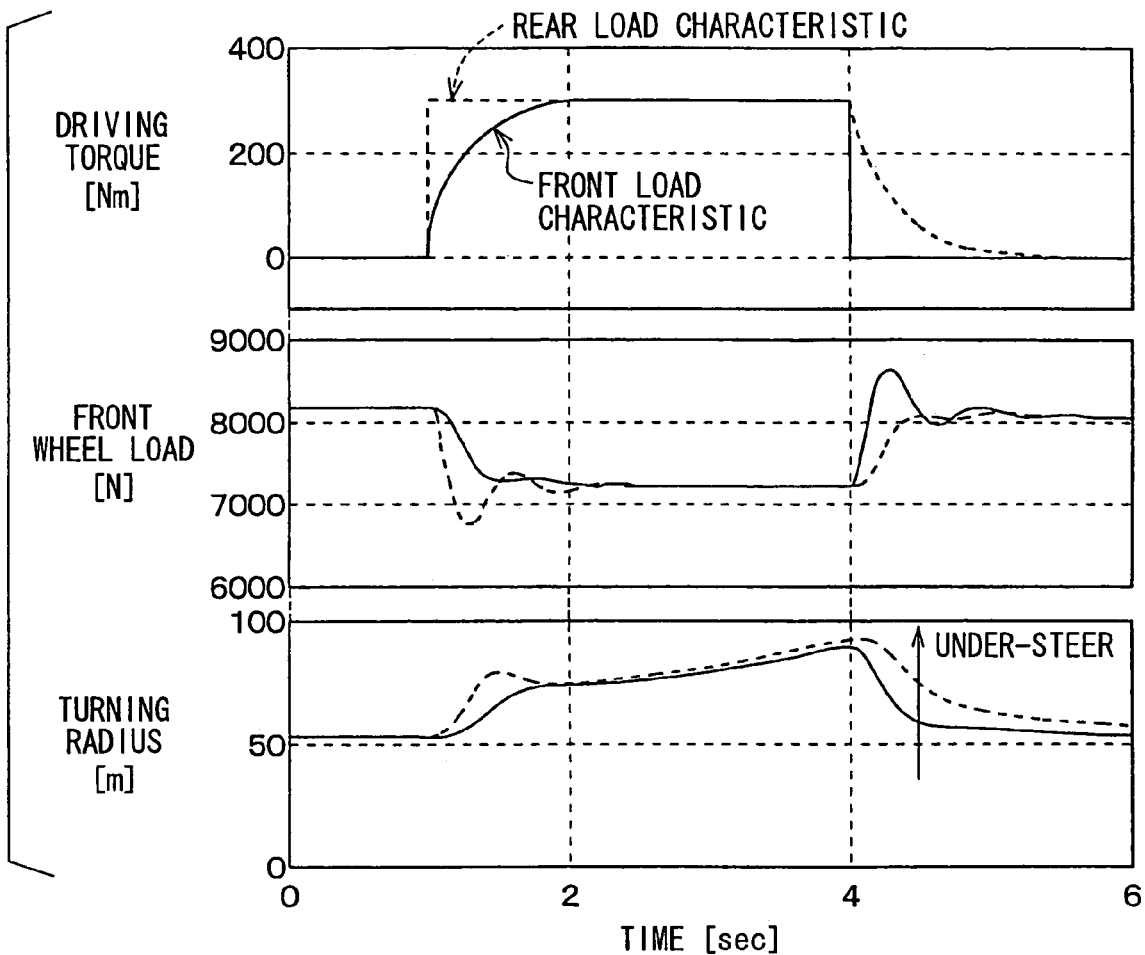
FIG. 6A are graphs showing a front-wheel load and a curving curvature with respect to a driving torque characteristic.
Figure 6B:
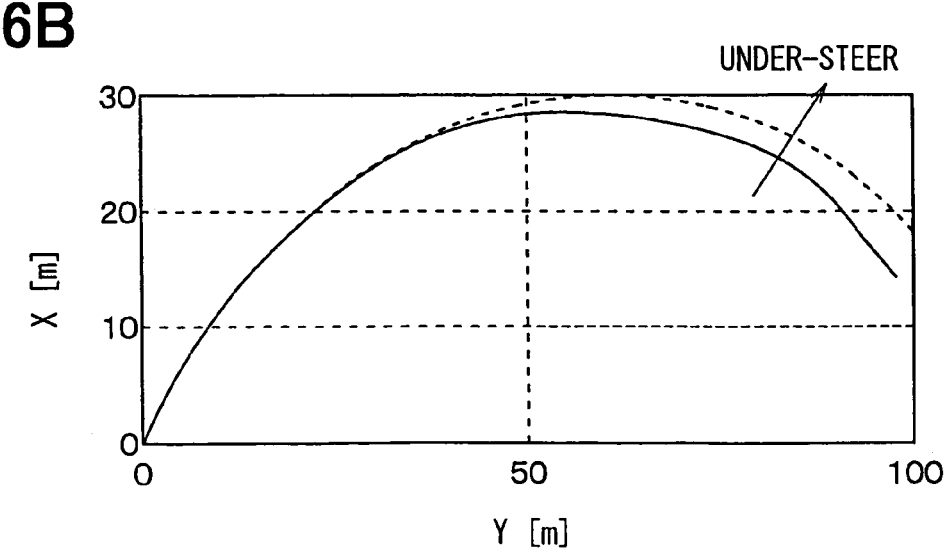
FIG. 6B is a graph showing variations in a vehicle's traveling track.

FIG. 6A shows a front wheel load and a turning radius with respect to a driving torque. FIG. 6B shows a relevant traveling track of the subject vehicle. As shown in these drawings, based on a driving torque set under a case where a driver tends to see a region near the subject vehicle, a front load characteristic (shown by a solid line) takes place to thereby cause the front wheel load to increase and the vehicle to over-steer. In contrast, based on a driving torque set under a case where a driver tends to see a region far from the subject vehicle, a rear load characteristic (shown by a dotted line) takes place to thereby cause the front wheel load to decrease and the vehicle to under-steer.

Here, thus explained structure of the vehicular kinetic control system can be divided into an upstream portion that includes the modifying unit 12 in the end of the upstream portion and a downstream portion that includes the power train coordinator 13 and the subsequent components for explaining the below. The downstream portion can be also an executing portion.

By thus modifying the driver request driving torque based on a road environment or the like, a kinetic characteristic of the vehicle can be changed. Namely, the modifying unit 12 modifies a driver request driving force so as to achieve a vehicular characteristic corresponding to a road environment. The executing portion that is downstream of the modifying unit 12 manages a response in a driving force to be practically generated. This structure can achieve a vehicular action meeting a driver's intention.

Further, this can decrease resultant modifying operations for changing the unintended vehicular actions by the driver and relieve the driver of loads in driving the vehicle. The vehicular kinetic characteristic that is changed by a vehicular mechanical structure or road shapes can be kept to be comparable, which can relieve the driver of burdens of studying characteristic variations based on traveling conditions.

To maintain a uniform response to a request in the upstream portion, the downstream executing portion is designed to maintain an engine response constant regardless of engine loads or engine rotation numbers by preferably selecting a lock-up clutch or a gear ratio and controlling an engine torque.

(Others)

In the above embodiment, the engine ECU 6 includes the modifying unit 12 to modify the driving torque corresponding to road environments. However, the modifying unit 12 can be included in an ECU other than the engine ECU 6, for instance, an integrated ECU that conducts vehicular controls as a whole, instead of the engine ECU 6. Further, the engine ECU 6 itself that includes the modifying unit 12 can be included in the integrated ECU.

In the above embodiment, a torque of an output shaft or an axle is used as a physical amount corresponding to a driving torque that a driver requests. However, others can be used as a physical amount.

In the above embodiment, the modifying unit 12 is shown in FIG. 5 as an example. However, the structure shown in FIG. 5 is only an example. A kinetic characteristic index $\Delta W$ can be determined so that other parameters can be also considered.

In the above embodiment, the speed sensor or the like is used for the speed detecting unit 2 that outputs a vehicle speed to the engine ECU 6. However, when an in-vehicle ECU computes a vehicle speed based on a detection signal of the speed sensor or the like, data representing the vehicle speed can be inputted to the engine ECU 6 via an in-vehicle LAN (CAN). Here, the in-vehicle ECU that computes the vehicle speed corresponds to the speed detecting unit 2.

It will be obvious to those skilled in the art that various changes may be made in the above-described embodiments of the present invention. However, the scope of the present invention should be determined by the following claims.

What is claimed is:

1. A vehicular kinetic control system provided in a vehicle, the vehicular kinetic control system comprising:
    an interpreting unit that obtains, based on an accelerator operating amount in the vehicle, a first physical amount corresponding to a first driving force that a driver of the vehicle requests;
    an environment detecting unit that detects environment information relating to the vehicle;
    a modifying unit that modifies the first physical amount based on the environment information to thereby set a second physical amount that corresponds to a second driving force that is finally requested;
    a driving force controlling unit that generates a control signal based on the second physical amount; and an actuator that generates the second driving force based on the control signal, wherein the modifying unit sets the second physical amount by modifying a response characteristic of the first physical amount based on the environment information.

2. The vehicular kinetic control system of claim 1,
wherein the environment detecting unit includes
a surrounding vehicle detecting unit that
  detects whether a certain vehicle that surrounds the vehicle is present or not, a distance between the vehicle and the certain vehicle, and a relative speed between the vehicle and the certain vehicle, and
  outputs, to the modifying unit, as the environment information, one of information indicating the distance and the relative speed and information indicating a danger degree of the vehicle, wherein the danger degree is based on the distance and the relative speed.

3. The vehicular kinetic control system of claim 1,
wherein the environment detecting unit includes
a navigation device that
  stores road map information, and
  outputs, to the modifying unit, as the environment information, one of information indicating a curvature of a road that the vehicle travels in future and information indicating a degree of a turning request to the vehicle, where in the degree of the turning request is based on the curvature.

4. The vehicular kinetic control system of claim 1,
wherein the environment detecting unit includes
a navigation device that
  stores road map information, and
  outputs information indicating a slope of a road that the vehicle travels in future as the environment information to the modifying unit.

5. The vehicular kinetic control system of claim 1,
wherein the environment detecting unit includes
a slope detecting unit that
  detects a slope of a road that the vehicle travels at present, and
  outputs information indicating the slope of the road that the vehicle travels at present as the environment information to the modifying unit.

6. The vehicular kinetic control system of claim 1,
wherein the modifying unit sets the second physical amount by modifying the first physical amount so that a response in a deceleration is hastened and a response in an acceleration is slowed, when the environment information indicates a state where the driver tends to see a region near the vehicle.

7. The vehicular kinetic control system of claim 1,
wherein the modifying unit sets the second physical amount by modifying the first physical amount so that a response in a deceleration is slowed and a response in an acceleration is hastened, when the environment information indicates a state where the driver tends to see a region far from the vehicle.

8. A vehicular kinetic control device that is provided in a vehicle and receives environment information relating to the vehicle, the vehicular kinetic control device comprising:

an interpreting unit that obtains, based on an accelerator operating amount in the vehicle, a first physical amount corresponding to a first driving force that a driver of the vehicle requests;

a modifying unit that modifies the first physical amount based on the environment information to thereby set a second physical amount that corresponds to a second driving force that is finally requested;

a driving force controlling unit that generates a control signal based on the second physical amount; and an actuator that generates the second driving force based on the control signal, wherein the modifying unit sets the second physical amount by modifying a response characteristic of the first physical amount based on the environment information.

* * * * *